US012253036B2

(12) United States Patent
Anderson et al.

(10) Patent No.: US 12,253,036 B2
(45) Date of Patent: Mar. 18, 2025

(54) DUAL FUEL ENGINE SYSTEM AND METHOD FOR CONTROLLING DUAL FUEL ENGINE SYSTEM

(71) Applicant: Cummins Power Generation Inc., Minneapolis, MN (US)

(72) Inventors: Travis Alva Anderson, Columbus, IN (US); Axel O. zur Loye, Columbus, IN (US); Mark A. Rosswurm, Columbus, IN (US); Paul Daniel Borisuk, Nashville, IN (US); Shashank Bishnoi, Columbus, IN (US); Matthew W. Isaacs, Moncks Corner, SC (US); Jason A. Gore, Highland Village, TX (US); Atin Tandon, Greenwood, IN (US); Jamie Robert John Sleigh, Chester le Street (GB)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/402,342

(22) Filed: Jan. 2, 2024

(65) Prior Publication Data
US 2024/0141842 A1 May 2, 2024

Related U.S. Application Data

(63) Continuation of application No. 17/944,910, filed on Sep. 14, 2022, now Pat. No. 11,873,772.

(51) Int. Cl.
*F02D 41/00* (2006.01)
*F02D 41/14* (2006.01)
*F02D 41/24* (2006.01)

(52) U.S. Cl.
CPC ..... *F02D 41/0027* (2013.01); *F02D 41/1401* (2013.01); *F02D 41/1446* (2013.01);
(Continued)

(58) Field of Classification Search
CPC ............ F02D 41/0027; F02D 41/1401; F02D 41/1446; F02D 41/2422; F02D 2041/1409;
(Continued)

(56) References Cited

U.S. PATENT DOCUMENTS 4,278,064 A 7/1981 Regueiro
5,937,800 A 8/1999 Brown et al.
(Continued)

FOREIGN PATENT DOCUMENTS

KR 10-1938914 1/2019
WO WO-02073016 A1 * 9/2002 ................ F02B 1/04
(Continued)

OTHER PUBLICATIONS

Debnath et al., "Effect of hydrogen-diesel quantity variation on brake thermal efficiency of a dual fuelled diesel engine", Journal of Power Technologies, Jan. 2012, vol. 92 (1), pp. 55-67.
(Continued)

*Primary Examiner* — Joseph J Dallo
(74) *Attorney, Agent, or Firm* — Foley & Lardner LLP

(57) ABSTRACT

A method for controlling a dual fuel engine system includes determining a gas flow target for an internal combustion engine of the dual fuel engine system, where the gas flow target is based on a gas power target of the internal combustion engine, a thermal efficiency estimate of the internal combustion engine, and a lower heating value (LHV) within the internal combustion engine. The method also includes adjusting the gas flow target based on at least one of a measured gas temperature or a measured gas injector pressure and determining at least one base gas injector command based on the adjusted gas flow target, a gas substitution rate estimate, and a gas substitution rate target. The method further includes determining, based on the at least one base
(Continued)

gas injector command, a gas injector command for at least one engine bank.

18 Claims, 9 Drawing Sheets

(52) U.S. Cl.
CPC .. *F02D 41/2422* (2013.01); *F02D 2041/1409* (2013.01); *F02D 2041/141* (2013.01); *F02D 2200/0606* (2013.01); *F02D 2200/0612* (2013.01); *F02D 2200/10* (2013.01)

(58) Field of Classification Search
CPC ....... F02D 2041/141; F02D 2200/0606; F02D 2200/0612; F02D 2200/10; F02D 19/0642; F02D 2200/1006; F02D 2200/101; F02D 19/081; F02D 19/087; F02D 41/0082; F02D 41/0085; F02D 41/0025; Y02T 10/30
See application file for complete search history.

(56) References Cited

U.S. PATENT DOCUMENTS

| | | | |
|---|---|---|---|
| 6,101,986 A | 8/2000 | Brown et al. | |
| 6,470,679 B1 | 10/2002 | Ertle | |
| 6,543,395 B2 | 4/2003 | Green | |
| 6,705,301 B2 | 3/2004 | Dollmeyer et al. | |
| 7,010,417 B2 | 3/2006 | Edwards et al. | |
| 7,707,821 B1* | 5/2010 | Legare | F02D 41/025 60/276 |
| 7,886,523 B1* | 2/2011 | Legare | F02M 35/10386 60/276 |
| 7,913,673 B2 | 3/2011 | Vanderslice et al. | |
| 8,509,974 B2 | 8/2013 | Sujan et al. | |
| 8,813,690 B2 | 8/2014 | Kumar et al. | |
| 8,834,318 B2 | 9/2014 | Sujan et al. | |
| 8,863,497 B1* | 10/2014 | Legare | F02D 41/1454 60/274 |
| 9,233,696 B2 | 1/2016 | Kumar et al. | |
| 9,248,736 B2 | 2/2016 | Green | |
| 9,254,849 B1 | 2/2016 | Green | |
| 9,266,542 B2 | 2/2016 | Daum et al. | |
| 9,278,614 B2 | 3/2016 | Green | |
| 9,371,789 B2 | 6/2016 | Rosswurm et al. | |
| 9,394,841 B1 | 7/2016 | Green | |
| 9,410,490 B2 | 8/2016 | Kolhouse et al. | |
| 9,421,861 B2 | 8/2016 | Green | |
| 9,428,047 B2 | 8/2016 | Green | |
| 9,527,518 B2 | 12/2016 | Acy et al. | |
| 9,528,447 B2 | 12/2016 | Green | |
| 9,669,851 B2 | 6/2017 | Cooper et al. | |
| 9,682,716 B2 | 6/2017 | Noffsinger et al. | |
| 9,689,681 B2 | 6/2017 | Napolitano et al. | |
| 9,696,066 B1 | 7/2017 | Green | |
| 9,733,625 B2 | 8/2017 | Kumar et al. | |
| 9,738,154 B2 | 8/2017 | Green | |
| 9,834,237 B2 | 12/2017 | Plotnikov et al. | |
| 9,835,098 B2 | 12/2017 | Rumbel et al. | |
| 9,845,744 B2 | 12/2017 | Green | |
| 9,885,318 B2 | 2/2018 | Green | |
| 9,931,929 B2 | 4/2018 | Green | |
| 9,973,831 B2 | 5/2018 | Mejegårdd et al. | |
| 10,032,123 B2 | 7/2018 | Mejegårdd et al. | |
| 10,086,694 B2 | 10/2018 | Green | |
| 10,113,493 B2 | 10/2018 | Atterberry et al. | |
| 10,145,317 B2 | 12/2018 | Zur Loye et al. | |
| 10,227,934 B2 | 3/2019 | Thomas et al. | |
| 10,308,265 B2 | 6/2019 | Fahmy | |
| 10,371,069 B2 | 8/2019 | Bzymek et al. | |
| 10,569,792 B2 | 2/2020 | Fahmy et al. | |
| 10,669,954 B2 | 6/2020 | King et al. | |
| 10,711,723 B2 | 7/2020 | Thomas et al. | |
| 10,808,670 B2 | 10/2020 | Books et al. | |
| 10,815,913 B2 | 10/2020 | Bruner et al. | |
| 10,920,687 B2 | 2/2021 | Hsieh et al. | |
| 10,935,449 B2 | 3/2021 | Barta et al. | |
| 11,125,139 B2 | 9/2021 | Ernst et al. | |
| 11,136,932 B2 | 10/2021 | Zur Loye et al. | |
| 2005/0121005 A1 | 6/2005 | Edwards | |
| 2012/0210988 A1 | 8/2012 | Willi | |
| 2013/0086893 A1 | 4/2013 | Shinoda et al. | |
| 2014/0074380 A1 | 3/2014 | Fisher et al. | |
| 2014/0352656 A1 | 12/2014 | Kolhouse et al. | |
| 2015/0300299 A1* | 10/2015 | Licitar | F23K 5/08 123/538 |
| 2015/0345408 A1 | 12/2015 | Sivasubramanian et al. | |
| 2016/0208764 A1 | 7/2016 | Mann et al. | |
| 2016/0222891 A1* | 8/2016 | Zeng | F02D 35/0053 |
| 2017/0089273 A1 | 3/2017 | Thomas et al. | |
| 2017/0122246 A1* | 5/2017 | Ottikkutti | F02D 41/401 |
| 2017/0226973 A1 | 8/2017 | Blizard et al. | |
| 2018/0142629 A1 | 5/2018 | Stockner et al. | |
| 2020/0271068 A1* | 8/2020 | Dodis | F02D 41/20 |
| 2020/0318556 A1 | 10/2020 | Chiu et al. | |
| 2021/0017918 A1 | 1/2021 | Bruner et al. | |
| 2021/0087981 A1 | 3/2021 | Wang et al. | |
| 2021/0301700 A1 | 9/2021 | Brahma | |

FOREIGN PATENT DOCUMENTS

| | | | |
|---|---|---|---|
| WO | WO-03/076788 | 9/2003 | |
| WO | WO-2012/017972 | 2/2012 | |
| WO | WO-2014/154227 A1 | 10/2014 | |
| WO | WO-2015149227 A1 * | 10/2015 | ............ F02D 11/105 |
| WO | WO-2020/200486 | 10/2020 | |

OTHER PUBLICATIONS

Non-Final Office Action on U.S. Appl. No. 17/944,910 DTD May 10, 2023.
Notice of Allowance on U.S. Appl. No. 17/944,910 DTD Sep. 13, 2023.
Non-Final Office Action for U.S. Appl. No. 17/944,900, dated Mar. 11, 2024, 6 pgs.
Notice of Allowance for U.S. Appl. No. 17/944,905, dated Mar. 21, 2024, 8 pgs.

* cited by examiner

DUAL FUEL ENGINE SYSTEM AND METHOD FOR CONTROLLING DUAL FUEL ENGINE SYSTEM

CROSS-REFERENCE TO RELATED PATENT APPLICATIONS

This application is a continuation of U.S. patent application Ser. No. 17/944,910, filed Sep. 14, 2022, the entire contents of which are hereby incorporated by reference herein.

BACKGROUND

The present disclosure relates generally to methods for controlling a dual fuel engine system.

Generally, a dual fuel engine system can include an original equipment manufacturer (OEM) machine control system, a base engine control system or module (ECM) operatively coupled to the OEM, and a gas control system operatively coupled to both the OEM machine control system and the base engine control system.

SUMMARY

One aspect of the present disclosure relates to a method for controlling a dual fuel engine system. The method includes determining a gas flow target for an internal combustion engine of the dual fuel engine system, the gas flow target being based on a gas power target of the internal combustion engine, a thermal efficiency estimate of the internal combustion engine, and a lower heating value (LHV) within the internal combustion engine. The method also includes adjusting the gas flow target based on at least one of a measured gas temperature or a measured gas injector pressure and determining at least one base gas injector command based on the adjusted gas flow target, a gas substitution rate estimate, and a gas substitution rate target. The method further includes determining, based on the at least one base gas injector command, a gas injector command for at least one engine bank.

Another aspect of the disclosure relates to a dual fuel engine system for an internal combusting engine. The system includes at least one gas injector operably coupled to the internal combustion engine having a left bank and a right bank, the internal combustion engine being operable in a dual fuel mode. The system further includes at least one proportional-integral-derivative (PID) controller communicably coupled to the internal combustion engine and the at least one gas injector. The at least one PID controller is configured to receive a feedforward input, a gas substitution rate estimate, and a gas substitution rate target. The at least one PID controller is further configured to output, based on the feedforward input, at least one base gas injector command and bias the at least one base gas injector command to each of the right bank and the left bank based on an exhaust temperature difference associated with each of the right bank and the left bank.

Yet another aspect of the disclosure relates to a dual fuel engine system operable in a dual fuel mode. The dual fuel engine system includes an internal combustion engine having at least one engine bank, at least one gas injector operably coupled to the internal combustion engine, and at least one controller communicably coupled to the internal combustion engine and the at least one gas injector. The at least one controller is configured to determine a gas flow target for the internal combustion engine based on a gas power target of the internal combustion engine, a thermal efficiency estimate of the internal combustion engine, and a lower heating value (LHV) within the internal combustion engine. The at least one controller is further configured to adjust the gas flow target based on at least one of a measured gas temperature or a measured gas injector pressure to determine an adjusted gas flow target for the dual fuel mode and determine at least one base gas injector command based on the adjusted gas flow target, a gas substitution rate estimate, and a gas substitution rate target. The at least one controller is further configured to determine, based on the at least one base injector command, a gas injector command, a gas injector command for the at least one engine bank.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
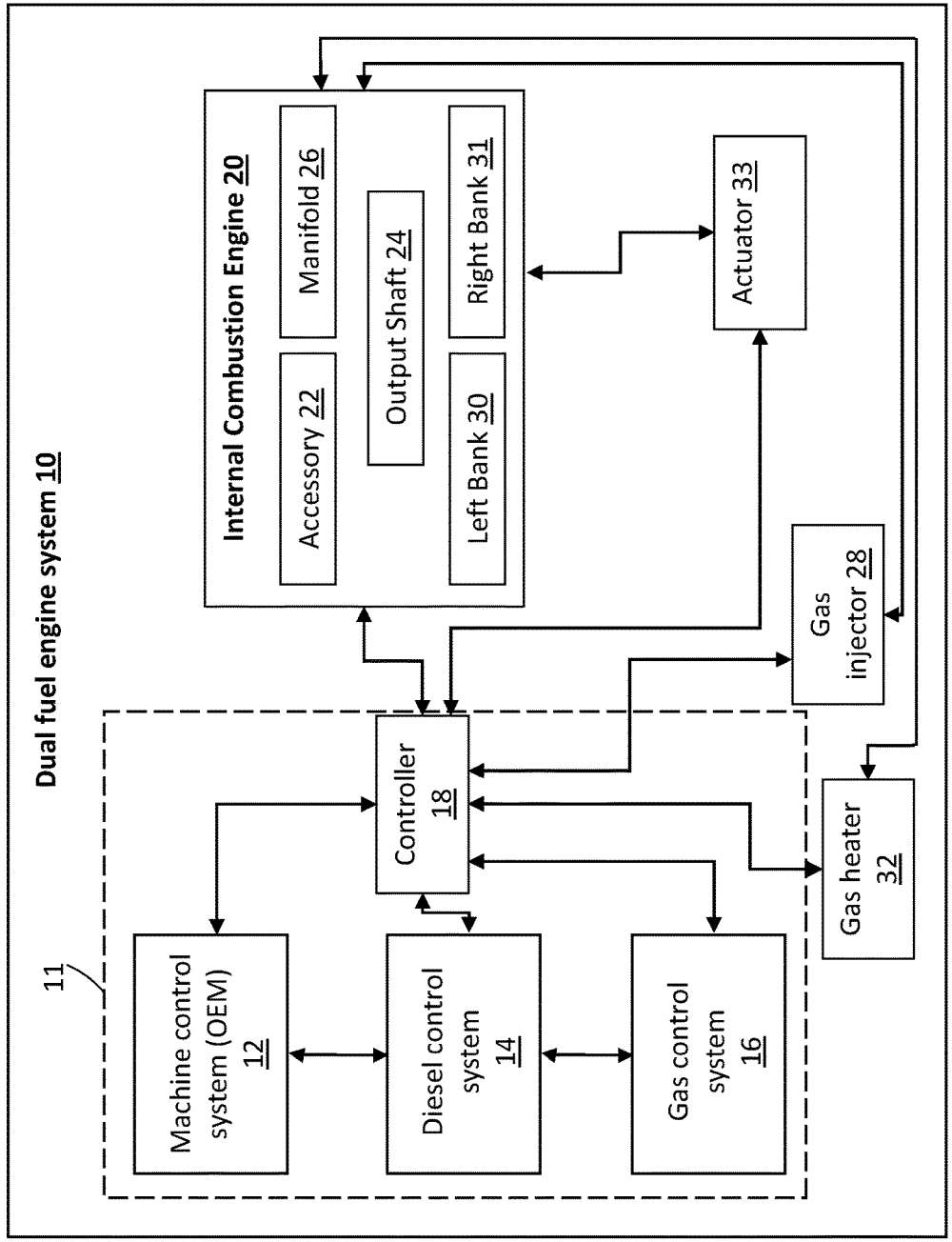
FIG. 1 is a block diagram of a dual fuel engine system, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are contemplated and made part of this disclosure.

The present disclosure pertains at least in part to systems and methods providing for reduced operating cost, improved efficiency and/or improved performance of a dual fuel engine system. In some embodiments, such systems and methods allow for meeting target emission levels. In some embodiments, protocols for control of the dual fuel system are adjustable to streamline interfacing among the diesel engine ECM, gas controllers, and OEM controllers. In various embodiments, the dual fuel engine system (and associated methods of operation) is tailored to maximize the use of a less-expensive gas fuel and minimize the use of diesel fuel while meeting performance and emissions requirements and maintaining robust engine protection. In particular, to meet Tier 4 emissions regulations with a dual fuel engine system, precise and robust control of a dual fuel engine system is needed. Such precise and robust control includes, but is not limited to, control of a gas fuel system, a diesel fuel system, and aftertreatment system included within the dual fuel engine system. The present disclosure outlines a system and method for precise and robust control of a dual fuel engine system including accurately determining (e.g., by measuring or estimating) multiple engine parameters (e.g., brake power, friction power, accessory power, diesel power, gas power, gas substitution rate, methane number, LHV, gas temperature, gas pressure, knock intensity, exhaust temperature, etc.) and using the determined parameters as inputs for determining appropriate commands for one or more actuators within the dual fuel engine system. The system and methods described herein are applicable to new engine builds or for retrofitting onto existing Tier 4 diesel engine systems. Advantageously, the systems and methods described herein are lower in cost and complexity as compared to typical port gas injection or cylinder pressure sensing systems.

Referring to FIG. 1, a block diagram of a dual fuel engine system 10 is shown, according to an exemplary embodiment. The dual fuel engine system 10 is configured to be an engine having a dual fuel operation mode, the engine configured to operate using two different fuels. In various embodiments, the fuels can include diesel and natural gas. In various embodiments, the dual fuel engine system 10 is configured for one or more oil and gas production applications (e.g., land based oil and/or gas drilling and hydraulic fracturing). As shown in FIG. 1, the dual fuel engine system includes an internal combustion engine 20, which is operably coupled to a control system 11 via at least one controller 18. The control system 11, which includes a machine control system (OEM system) 12, a diesel control system 14, and a gas control system 16, is configured to send one or more inputs to the controller 18, where the controller 18 then controls the internal combustion engine 20. In various embodiments, the controller 18 is configured to include a processor and a non-transitory computer readable medium (e.g., a memory device) having computer-readable instructions stored thereon that, when executed by the processor, cause the at least one controller 18 to carry out one or more operations. In various embodiments, the at least one controller 18 is a computing device (e.g., a microcomputer, microcontroller, or microprocessor). In other embodiments, the at least one controller 18 is configured as part of a data cloud computing system configured to receive commands from a user control device and/or remote computing device.

The controller 18 is also operably coupled to at least one gas injector 28, at least one gas heater 32, and at least one actuator 33. In other embodiments, the dual fuel engine system 10 does not include a gas heater. In some embodiments, each of the gas injector 28, the heater 32, and the actuator 33 are operably coupled to the internal combustion engine 20. In various embodiments, the gas injector 28 is configured to control or facilitate injection of gas into the internal combustion engine 20. The at least one gas heater 32 is configured to adjust a temperature of gas flowing within the internal combustion engine 20. The actuator 33 can include one or more diesel type actuators, air handling actuators, aftertreatment actuators, or any other type of actuator within the dual fuel engine system 10. Accordingly, during operation, the controller 18 can send one or more inputs to one or more of the internal combustion engine 20, the gas injector, 28, the heater 32, or the actuator 33 to facilitate a desired mode of operation of the dual fuel engine system 10.

As shown, the internal combustion engine 20 includes an output shaft 24 and may also include one or more accessories 22. The internal combustion engine 20 further includes at least one manifold 26. In various embodiments, the at least one manifold 26 includes, but is not limited to an intake manifold. The internal combustion engine 20 also includes at least one engine cylinder bank. In some embodiments, the at least one engine cylinder bank includes a left bank 30 and a right bank 31. During operation of the dual fuel engine system 10, the control system 11 can receive one or more inputs from a user and/or one or more sensors within the dual fuel engine system 10 and control operation of at least one of the internal combustion engine 20, the gas injector 28, or the actuator 33 via the controller 18.

Figure 2:
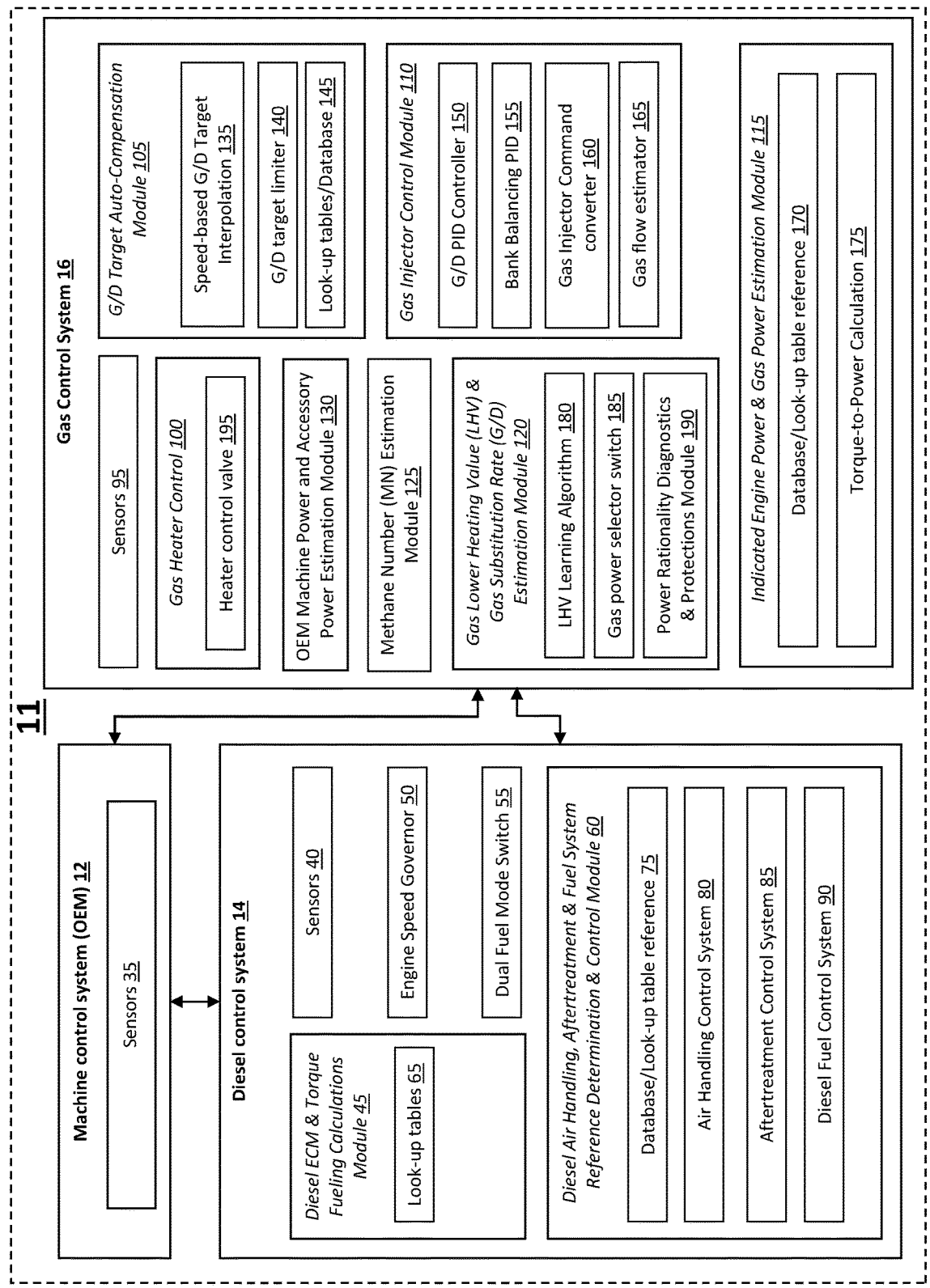
FIG. 2 is a block diagram of a control system of the dual fuel engine system of FIG. 1, according to an exemplary embodiment.

FIG. 2 is a block diagram of the control system 11 of the dual fuel engine system 10, according to an exemplary embodiment. As shown, the OEM system 12 can include one or more sensors 35, which are each coupled to one or more corresponding components within the dual engine system 10. In various embodiments, the one or more sensors 35 can be operably coupled to or in communication with a fracturing ("frac") pump, accessories, one or more inlets or outlets of the internal combustion engine 20, or any other component within the dual fuel engine system 10 (e.g., cooling fan, flywheel, brakes, etc.). The OEM system 12 can include one or more processors configured to receive inputs from the sensors 35. In various embodiments, the one or more inputs from the sensors 35 can include a power estimate, a frac pump speed, a frac pump discharge pressure, a dual fuel mode activation request, or any other input detectable by the one or more sensors 35. As shown, the OEM system 12 is communicably coupled to each of the diesel control system 14 and the gas control system 16, where the OEM system 12 can output information sensed by the one or more sensors 35 or can receive inputs from the diesel control system 14 and/or the gas control system 16.

As shown in FIG. 2, the diesel control system 14 includes one or more sensors 40, which are coupled to or disposed adjacent to one or more components within the internal combustion engine 20. In various embodiments, the one or more sensors 40 can be configured to determine (e.g., sense, detect, measure) at least one of an engine speed, an intake manifold temperature, an engine coolant temperature, an oil temperature, a cooling fan duty cycle, a diesel fuel rate, or an operational state of a dual fuel mode switch 55. In various embodiments, the dual fuel mode switch 55 can be configured to switch operation of the internal combustion engine 20 between single or dual fuel modes. Additionally, or alternatively, the one or more sensors 40 can be configured to determine a lower heating value (LHV) of the gas. In yet other embodiments, the one or more sensors 40 can be configured to determine one or more parameters indicative of the LHV, which can include, but are not limited to, a gas density or a speed of sound. The diesel control system 14 also includes an engine speed governor 50. In various embodiments, the engine speed governor 50 can include one or more controllers configured to control a speed of the internal combustion engine 20.

The diesel control system 14 also includes a diesel engine control system (ECM) and a torque fueling calculations module 45. In various embodiments, the torque fueling calculations module 45 can include one or more processors in communication with one or more reference databases or repositories, where the one or more processors are configured to reference data stored within the databases in order to carry out torque calculations related to the internal combustion engine 20. For example, in various embodiments, the torque fueling calculations module 45 is configured to calculate a torque based on one or more known parameters. In various embodiments, the module 45 is configured to receive inputs corresponding to a dual fuel mode operation condition, an engine friction parameter, an accessory ("parasitic") torque parameter, engine speed, an OEM machine power estimate, and an engine accessory power estimate (e.g., gas controller, flywheel, etc.). In various embodiments, the one or more reference databases or repositories can include look-up tables 65. In various embodiments, the one or more look-up tables 65 includes one or more chi-tables. In various embodiments, the look-up tables 65 can include reference information related to engine torque, engine speed, engine friction parameters, parasitic or accessory torque parameters, diesel fuel rates, intake manifold temperatures, and/or an engine coolant temperature. In various embodiments, the engine friction parameters of the look-up tables 65 can be based on at least one of an oil temperature or a coolant temperature. In some embodiments, the parasitic or torque parameters of the look-up tables 65 can be based on a cooling fan duty cycle (i.e., of a cooling fan within the internal combustion engine 20). In various embodiments, the module 45 is configured to determine at least one of a total diesel fueling amount, a "fast" equivalent total fueling amount, an equivalent total fueling amount (i.e., a gas fueling equivalent of diesel fueling), a friction torque estimate, or a diesel fuel rate.

The diesel control system 14 also includes a diesel air handling, aftertreatment & fuel system reference determination and control module 60. In various embodiments, the control module 60 can include at least one processor in communication with a database (e.g., look-up tables) 75. In various embodiments, the database 75 includes a data repository relating engine speed, fueling amounts (e.g., equivalent total fueling amount, fast equivalent total fueling amount), gas substitution rate (G/D), compressor inlet density (CID), or any other related parameters. Accordingly, the one or more processors within the control module 60 are configured to reference data stored within the database 75 to determine one or more system inputs for at least one of an air handling control system 80, an aftertreatment control system 85, or a diesel fuel control system 90. In various embodiments, the one or more system inputs includes, but is not limited to, an actuator command, or a target (e.g., a set point, operating threshold, etc.) for at least one of the diesel air handling control system 80, aftertreatment control system 85, or diesel fuel control system 90.

As shown in FIG. 2, the gas control system 16 can include one or more sensors 95, which are coupled to or disposed adjacent to one or more components within the internal combustion engine 20. In various embodiments, the one or more sensors 95 can be configured to determine (e.g., sense, detect, measure, etc.) at least one of an OEM machine torque, an accessory torque, a methane number (MN), a gas injector pressure, a gas supply pressure, a gas flow amount, an engine bank exhaust temperature, an aftertreatment system temperature, an LHV, a gas temperature, a dual fuel mode input, a knock intensity, G/D, or any other related parameter. In some embodiments, the engine bank exhaust temperature can correspond to a left bank average exhaust temperature and/or a right bank average exhaust temperature. In some embodiments, a bank average exhaust temperature can be calculated by averaging the measurements from individual exhaust port temperature sensors. In some embodiments, the exhaust port temperature sensors can be among the at least one sensors 35, 40, and/or 95. The gas control system 16 also includes an OEM machine power and accessory power estimation module 130. In various embodiments, the OEM machine power and accessory power estimation module 130 can include one or more processors configured to estimate an OEM machine power and/or accessory power based on one or more inputs received by the one or more sensors 95 (and/or from the sensors 35, 40). In some embodiments, the accessory power can be a power associated with one or more accessory components and/or output shafts (e.g., output shaft 24) within the dual fuel engine system 10. In various embodiments, the OEM machine power and accessory power estimation module 130 is configured to receive inputs related to an OEM machine power estimate, an accessory torque measurement, a pump speed, a pump discharge pressure, and an engine speed, where the one or more processors then estimate an accessory power estimate based on the inputs. Similarly, the gas control system 16 also includes a MN estimation module 125. In various embodiments, the MN estimation module 125 can include one or more processors configured to estimate a MN associated with the internal combustion engine 20 based on one or more inputs received by the one or more sensors 95 (and/or from the sensors 35, 40). In various embodiments, at least one of the sensors 35, 40, or 90 may be assigned or partitioned to any of the different control systems (e.g., OEM system 12, diesel control system 14, gas control system 16) within the dual fuel engine system 10 without changing overall functionality of the sensors. For example, in various embodiments, the sensors 95 may be included within or operably coupled to any of the OEM system 12 the diesel control system 14, or the gas control system 16. Similarly, the sensors 35 may be included within or operably coupled to any of the OEM system 12, the diesel control system 14, or the gas control system 16. The sensors 40 also may be included within or operably coupled to any of the OEM system 12, the diesel control system 14, or the gas control system 16.

The gas control system 16 also includes an indicated engine power and gas estimation module 115. The engine power and gas estimation module 115 can include one or more processors, which are configured to receive one or more inputs related to operation of the dual fuel engine system 10. The engine power and gas estimation module 115 can be further configured to determine, using a database 170 and/or a torque-to-power calculation system 175, at least one of a thermal efficiency estimate, a first gas power estimate, an indicated diesel power estimate, a net engine power estimate, an intake manifold temperature (e.g., a maximum intake manifold temperature), and/or other related parameters. In various embodiments, the database 170 is a look-up table. In some embodiments, the torque-to-power calculation system 175 can be or include computer logic. In various embodiments, the engine power and gas estimation module 115 is configured to receive one or more inputs corresponding to a G/D estimate, a friction torque estimate, an accessory ("parasitic") torque estimate, a diesel fuel rate, an engine speed, an intake manifold temperature, and/or a MN estimate. In embodiments, the MN estimate is determined by the MN module 125. Although the terms "torque" and "power" are used in various instances throughout the disclosure, it should be understood that in various embodiments, torque can be used in place of power or vice versa. For example, it should be understood that power can be calculated from torque and speed and vice versa. In yet other embodiments, any other parameter indicative of a load (e.g., alternatively or in addition to torque and/or power) can be determined and/or used in operations carried out by the control system 11.

The gas control system 16 also includes a gas LHV and G/D estimation module 120. The LHV and G/D estimation module 120 can include a gas power selector switch 185, a LHV learning algorithm 180 configured to process one or more received inputs, and a power rationality diagnostics and protections module 190. In various embodiments, the LHV learning algorithm 180 includes a filter (e.g., a low-pass filter, a moving average filter, etc.) and/or an adaptive learning routine. In some embodiments, the one or more inputs are received from the sensors 95. The LHV and G/D estimation module 120 can include one or more processors configured to receive inputs including a total gas flow estimate (i.e., of gas flowing within the engine system 10), a thermal efficiency estimate, an indicated diesel power estimate, and a first indicated engine power estimate. In various embodiments, the one or more processors of the LHV and G/D estimation module 120 can be received from the sensors 35, 40, and/or 95. The LHV and G/D estimation module 120 can consequently estimate a G/D amount and an LHV amount associated with the internal combustion engine 20. In various embodiments, the one or more processors within the LHV and G/D estimation module 120 can determine the LHV and the G/D estimate amount by multiplying the total gas flow estimate by the thermal efficiency estimate and using the result to normalize the first gas power estimate (e.g., by dividing the first gas power estimate by the product of the total gas flow estimate the thermal efficiency estimate) to determine an instantaneous LHV amount. The LHV learning algorithm 180 can process the instantaneous LHV amount to then determine (i.e., learn) the LHV estimate. In various embodiments, the gas power selector switch 185 can be configured to receive inputs corresponding to first and second power estimates. In some embodiments, the gas power selector switch 185 can also be configured to use the first and second power estimates to output a final gas power estimate. In various embodiments, the final gas power estimate is based on a maximum or minimum of the first and second power estimates. In various embodiments, the power rationality diagnostics and protections module 190 can include one or more processors configured to receive inputs corresponding to the first and second indicated engine power estimates. In some embodiments, the power rationality diagnostics and protections module 190 is further configured to, based on and responsive to a comparison of one or both of the first and second indicated engine power estimates to one or more thresholds, initiate one or more diagnostic operations or engine protective protocols.

As shown, the gas control system 16 further includes a G/D target auto-compensation module 105. In various embodiments, the G/D target auto-compensation module 105 is configured to adjust or compensate the G/D target of the internal combustion engine 20. The module 105 is configured to receive one or more inputs indicating an engine speed, an engine load (e.g., power, torque, etc.), an intake manifold temperature, and/or a MN estimate. In various embodiments, one or more inputs are received by the module 105 from the sensors 95, 35, and/or 40. In some embodiments, the one or more inputs received by the module 105 are processed by a speed-based G/D target interpolation unit 135 to determine the G/D target based on the indicated engine speed. In various embodiments, the speed-based G/D target interpolation unit 135 determines the G/D target based on the indicated engine speed by using data stored in one or more databases 145. In some embodiments, the one or more databases 145 can include one or more look-up tables. The module 105 also includes a G/D target limiter 140, which includes one or more processors configured to determine a G/D target limiting value based on one or more inputs. In various embodiments, the one or more inputs can include an engine knock, an exhaust temperature, and/or a diesel fuel amount. In various embodiments, the exhaust temperature corresponds to an exhaust temperature of an engine bank. The gas control system 16 can use the G/D target limiting value, together with a first indicated engine power estimate, to determine a gas power target value.

As shown in FIG. 2, the gas control system 16 includes a gas injector control module 110, which includes at least one G/D proportional-integral-derivative (PID) controller 150. In various embodiments, the PID controller 150 is configured to receive a feedforward input, the feedforward input being based on a gas injector pressure and a temperature compensated gas flow target. In various embodiments, the gas injector pressure and temperature can be measured by the sensors 95, 35, and/or 40. The controller 150 can also receive a feedback input corresponding to the G/D estimate and a target input corresponding to the G/D controller. Responsive to receiving the feedforward, feedback, and target inputs, the PID controller 150 can output at least one base gas injector command. In various embodiments, the at least one base gas injector command is associated with at least one engine bank gas injector command. In some embodiments, the at least one engine bank gas injector command includes a left bank gas injector command and/or a right bank gas injector command.

A gas injector command converter 160 can be operably coupled to the PID controller 150. In various embodiments, the gas injector command converter 160 can include one or more processors configured to convert the base gas injector command to the at least one engine bank gas injector command. The gas injector control module 110 can also include a bank balancing PID controller 155. In various embodiments, the PID controller 155 is configured to receive a feedback input corresponding to a difference in exhaust temperatures between a left bank of the internal combustion engine 20 (e.g., left bank 30) and a right bank of the internal combustion engine 20 (e.g., right bank 31), and a target value associated with the exhaust temperature difference. In various embodiments, the target value is zero. Responsive to the feedback and target inputs, the PID controller 155 is configured to output a left bank correction amount and a right bank correction amount. In various embodiments, one or both of the left and right bank correction amounts can be either positive or negative values. The output left and right bank correction amounts can be each added to the base gas injector command (e.g., output from the PID 150), which the gas injector command converter 160 can convert to the respective left and right bank gas injector commands. The gas flow estimator 165 is configured to receive each of the left and right bank gas injector commands, together with a gas pressure and a gas temperature. In various embodiments, the gas flow estimator 165 can include or be coupled to one or more processors within the module 110. In some embodiments, the gas pressure and/or gas temperature are measured by the sensors 95, 35, and/or 40. In various embodiments, the gas flow estimator 165 is configured to output a total gas flow estimate associated with the internal combustion engine 20 based on the left and right bank gas injector commands, the gas pressure, and the gas temperature.

Finally, as shown in FIG. 2, the gas control system 16 includes a gas heater control module 100. In various embodiments, the gas heater control module 100 is configured to control an operational state of the at least one heater 32 coupled to the internal combustion engine 20. In various embodiments, the gas heater control module 100 includes one or more processors that are configured to receive one or more inputs from the at least one controller 18 and/or from other components within the control system 11. The one or more processors within the gas heater control module 100 can be configured to cause the gas heater control module 100 to change an operational state of the at least one heater 32. In some embodiments, changing the operational state of the at least one heater 32 can include adjusting an operational setting of a heater control valve 195 to control the operational state of the at least one heater 32. In various embodiments, the at least one heater 32 can be an electric heater. In other embodiments, the at least one heater 32 can be configured to provide heat using engine coolant.

Figure 3:
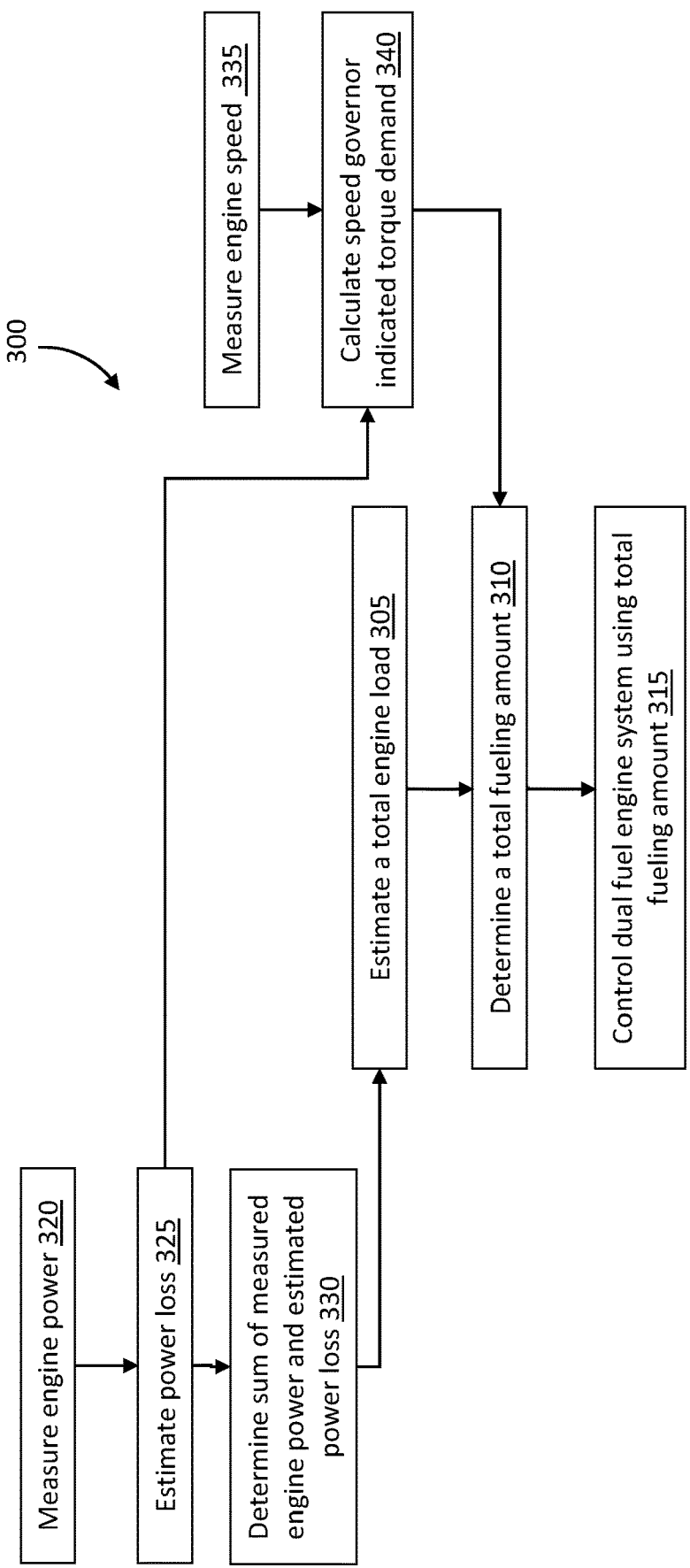
FIG. 3 is a flow diagram illustrating a method carried out by the control system of FIG. 2, according to an exemplary embodiment.

In various implementations, the engine control system 11, which includes the OEM system 12, the diesel control system 14, and the gas control system 16, can cooperate to control the dual fuel engine system 10. FIG. 3 shows a flow diagram illustrating a method 300 of controlling the dual fuel engine system 10, according to an exemplary embodiment. In an operation 305, the engine control system 11 estimates a total engine load (e.g., power, torque, etc.) of the internal combustion engine 20. In various embodiments, the OEM system 12 calculates the total engine load by determining a first load amount ("primary load") transferred through the engine (e.g., via a flywheel, frac pump load, etc.) and broadcast the determined first load (e.g., via a datalink) to the diesel control system 12 and/or the gas control system 16. In embodiments where the OEM system 12 controls accessory loads ("secondary load," e.g., cooling fan loads) within the diesel fuel engine system 10, the OEM system 12 can estimate the accessory load, add the accessory load to the first load amount, and then broadcast the sum, which is indicative of the total engine load, (e.g., via the datalink) to the systems 14 and/or 16. The control system 11, in an operation 310, the control system 11 can determine a total fueling amount of the internal combustion engine 20. The control system 11, in an operation 315, can then control the dual fuel engine system 10 using the total fueling amount determined in the operation 310.

Figure 4:
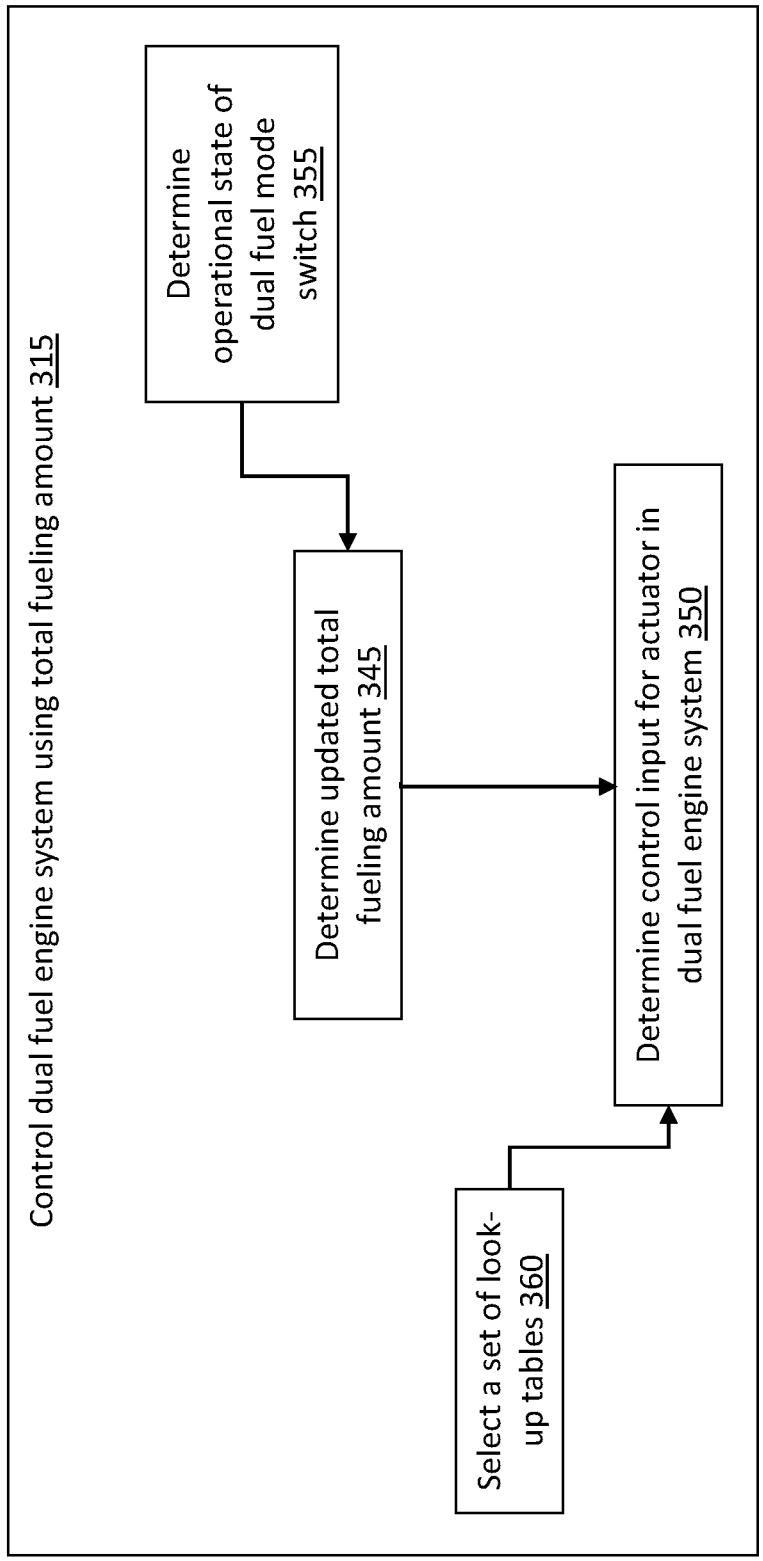
FIG. 4 is a flow diagram illustrating a method carried out by the control system of FIG. 2, according to an exemplary embodiment.

In various implementations, the control system 11 can estimate the total engine load (e.g., power, torque, etc.). In some implementations, the control system 11 estimates the total engine load in the operation 305 by measuring an engine power in an operation 320, estimating a power loss in an operation 325, and determining a sum of the measured engine power and estimated power loss in an operation 330. In some embodiments, the estimated total engine load can be based on an input received from the OEM system 12 (e.g., from one or more sensors, which may sense at least one of a pump discharge pressure, speed, current, or voltage) responsive to or indicative of an external load. The OEM system 12 may then use the input (i.e., the sensed information) to calculate an engine load. The OEM system 12 may then output the calculated load value to the gas control system 16 and/or the diesel control system 14 using a datalink signal and/or an analog signal (e.g., 4-20 mA). In some embodiments, the external load corresponds to at least one of a generator or a pump operably coupled to the internal engine 20. In various implementations, the engine control system 11 can determine the total fueling amount in an operation 310. In some implementations, the control system 11 determines the total fueling amount in the operation 310 based, at least in part, on a measured engine speed 335 and a calculated speed governor indicated torque demand 340. As shown in FIG. 4, in various implementations, controlling the dual fuel engine system 10 in operation 315 can include determining an updated total fueling amount in an operation 345 and determining at least one control input for the at least one actuator 33 in an operation 350. In various embodiments, the at least one actuator 33 can be a diesel fuel system actuator. In various implementations, the updated total fueling amount determined in operation 345 can be based on determining an operational state of the dual fuel mode switch 55 in an operation 355. In various embodiments, the updated fueling amount determined in the operation 345 includes a first updated fueling amount and a second updated fueling amount. In some embodiments, the first updated fueling amount corresponds to a maximum between the total fueling amount and a diesel fuel command. In some embodiments, the second updated total fueling amount is determined by subtracting the diesel fuel command from the first total updated fueling amount to determine a diesel fuel equivalent of a gas fueling amount and adding the diesel equivalent fueling amount to a second diesel fuel command.

In various implementations, determining the control input for the at least one actuator 33 (in the operation 350) can be based on selecting a set of look-up tables. The information in the look-up tables can then be referenced in determining the control input. The look-up tables can contain information from one or more of the diesel ECM and torque fueling calculations module 45, the diesel air handling, aftertreatment and fuel system reference determination and control module 60, and/or the indicated engine power and gas power estimation module 115. The selection of the set of look-up tables can be performed in an operation 360. In various embodiments, selecting the set of look-up tables in the operation 360 includes determining a compressor inlet density (CID) of the internal combustion engine 20. In some embodiments, selecting the set of look-up tables in the operation 360 additionally or alternatively includes determining a G/D within the internal combustion engine 20. In other embodiments, selecting the set of look-up tables in the operation 360 additionally or alternatively includes determining an operational state of the dual fuel mode switch 55. In some embodiments, selecting the set of look-up tables in the operation 360 includes selecting at least one of an air handling reference table, an aftertreatment reference table, or a fueling reference table.

In various implementations, the control system 11 can determine a maximum amount between the total fueling amount (from operation 310) and a first diesel fuel command. In various embodiments, the first diesel fuel command is determined from the diesel control system 14. In some embodiments, the control system 11 can be configured to determine a second updated total fueling amount. In various embodiments, the second updated fueling amount is determined by subtracting the first diesel fuel command from the first updated total fueling amount to determine a diesel fuel equivalent of a gas fueling amount associated with the internal combustion engine and adding the diesel fuel equivalent of a gas fueling amount to a second diesel fuel command to determine the second updated total fueling amount. In various embodiments, the control system 11 can determine at least one actuator command based on the engine speed and at least one of the first updated total fueling amount or the second updated total fueling amount. In some embodiments, the at least one actuator command can be associated with at least one of an actuator within the air handling control system 80, the aftertreatment control system 85, the diesel fuel control system 90, or the actuator 33.

In various embodiments, determining the total fueling amount in the operation 310 can include referencing one or more torque-to-fuel look-up tables. In various embodiments, the one or more torque-to-fuel look-up tables are determined or referenced from the diesel ECM and torque fueling calculations module 45. In various embodiments, the look-up tables can be based on engine speed and an indicated diesel torque input. In some embodiments, the indicated diesel torque input can be determined by the sensors 35. In various embodiments, the indicated diesel torque input determined in the operation 310 is based on a sum of a friction power estimate and an engine speed torque demand amount. In some embodiments, the engine speed torque demand amount corresponds to a difference between the engine speed and a predetermined engine speed target. In various embodiments, the control system 11 determines the power loss estimate in the operation 325. In some embodiments, the control system 11 determines the power loss estimate in the operation 325 by estimating a friction torque amount associated with the internal combustion engine 20, estimating an accessory torque amount, determining a charge air pumping torque amount, and determining the engine speed. In various embodiments, the engine speed is determined via the sensors 35, 40, and/or 95. In various embodiments, the charge air pumping torque amount is an estimate of a pumping loss associated with the diesel fuel engine system 10, where the pumping loss corresponds to an amount of work done by the engine to ingest air into the engine to facilitate combustion and then expel combustion products into the atmosphere. In some embodiments, the charge air pumping torque can be measured using cylinder pressure data determined during engine development. In various embodiments, data determined during engine development may be used to calibrate a pumping torque virtual sensor (i.e., operably coupled to the OEM system 12, diesel control system 14, and/or gas control system 16) configured to sense the charge air pumping torque amount.

In some implementations, the friction torque estimate can be determined from a look-up table. In various embodiments, the look-up table is determined or referenced from the diesel ECM and torque fueling calculations module 45. In some embodiments, the look-up table is based on the engine speed and an engine friction parameter. In some embodiments, the engine friction parameter can correspond to an oil temperature or a coolant temperature within the internal combustion engine 20 of the dual fuel engine system 10. In various embodiments, the control system 11 can be configured to determine the accessory toque estimate from a look-up table. In various embodiments, the look-up table is determined or referenced from the diesel ECM and torque fueling calculations module 45. In some embodiments, the look-up table is based on the engine speed and an accessory torque parameter. In various embodiments, the accessory torque parameter can correspond to a cooling fan power amount (e.g., a measurement or estimate) or a duty cycle commanded by the internal combustion engine 20 of the dual fuel engine system 10.

In various embodiments, the control system 11 is configured to determine the first diesel fuel command from a torque-to-fuel look-up table. In various embodiments, the torque-to-fuel look-up table is determined or referenced from the diesel ECM and torque fueling calculations module 45. In some embodiments, the torque-to-fuel look-up table is based on the engine speed (i.e., of the internal combustion engine 20) and a sum of a friction power estimate and a torque demand amount associated with the internal combustion engine 20. In various implementations, the torque demand amount is set by the engine speed governor 50.

Figure 5:
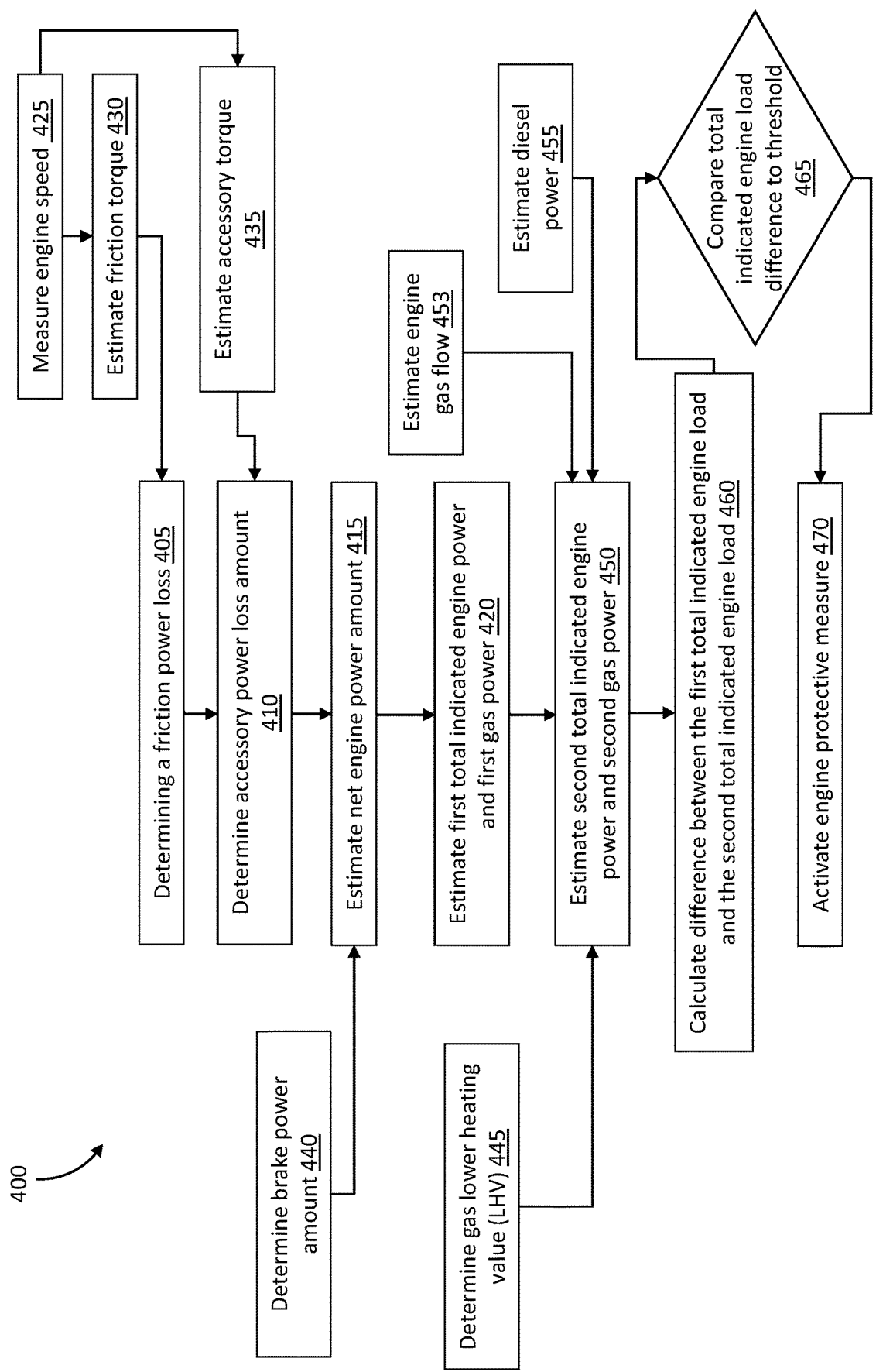
FIG. 5 is a flow diagram illustrating a method carried out by the control system of FIG. 2, according to an exemplary embodiment.

In various embodiments, the control system 11 can be configured to activate one or more protective measures associated with the internal combustion engine 20. In some embodiments, the control system 11 is configured to activate the one or more protective measures via the power rationality diagnostics and protections module 190. FIG. 5 shows a method 400 that can be implemented by the control system 11 to activate one or more engine protective measures. In an operation 405, the control system 11 is configured to determine a friction power loss amount. In various implementations, the friction power loss amount can be determined by measuring a speed of the internal combustion engine 20 in an operation 425 and estimating a friction torque amount in an operation 430. After determining the friction power loss amount in the operation 405, the control system 11 can determine an accessory power loss amount in an operation 410. In various embodiments, the accessory power loss amount can be associated with loads applied by the OEM system 12 (e.g., cooling fans, pumps, alternators, etc.) and/or any other accessory component within or coupled to the internal combustion engine 20.

In various embodiments, the accessory power loss amount can be based on the measured engine speed (determined in the operation 425) and based on an estimated accessory torque amount determined in an operation 435. Using the accessory power loss amount and the friction power loss amount, the control system 11 can estimate a net engine power amount in an operation 415. In various embodiments, the net engine power amount can also be based on a brake power amount (e.g., engine dynamometer measurements) determined by the control system 11 in an operation 440. Using the estimated net engine power amount determined in the operation 415, the control system 11 can estimate a first indicated engine power and a first gas power amount in an operation 420. In various embodiments, the control system 11 can also estimate an indicated diesel power. In some embodiments, the control system 11 is configured to estimate the indicated diesel power by multiplying a determined thermal efficiency correction amount by a determined diesel power estimate.

In some embodiments, determining the diesel power estimate includes using a first look-up table. In various embodiments, the first look-up table is determined or referenced from the diesel ECM and torque fueling calculations module 45. In some embodiments, the first look-up table is based on a diesel fuel rate and the engine speed. In various embodiments, determining the thermal efficiency correction amount includes referencing a first set of look-up tables. In some embodiments, the first set of look-up tables is determined or referenced from the diesel ECM and torque fueling calculations module 45. In various embodiments, the first set of look-up table is based on a G/D of the internal combustion engine 20, an MN associated with the internal combustion engine 20, and/or an intake manifold temperature within the internal combustion engine 20. In various embodiments, estimating the first gas power amount includes subtracting the indicated diesel power from the indicated engine power.

The control system 11 can then estimate a second indicated engine power and a second gas power amount in an operation 450. In various embodiments, the second total indicated engine power and the second gas power amount can be based, at least in part, on a gas LHV value determined in an operation 445. In various embodiments, the LHV determined in the operation 45 can be based on the first gas power amount (determined in the operation 420), a total gas flow estimate, and the thermal efficiency correction amount. In some implementations, the LHV can be determined by an estimate. In various embodiments, the control system 11 can determine the LHV estimate by dividing the first gas power amount by a multiple of the gas flow estimate and the thermal efficiency correction amount. In various implementations, the resultant LHV is an instantaneous LHV amount. In some embodiments, the control system 11 can be configured to implement a learning algorithm to determine the LHV estimate from the instantaneous LHV amount.

In other embodiments, the second total indicated engine power and the second gas power amount can be based additionally or alternatively on an estimated engine gas flow amount (determined in an operation 453) and an estimated diesel power amount (determined in an operation 455). In various embodiments, determining the second total indicated engine power includes determining a product of the total gas flow estimate and the LHV estimate, and summing the product of the total gas flow estimate and the LHV estimate with the diesel power estimate. In some embodiments, the control system 11 can be configured to determine a first gas power estimate based on the first total indicated engine power and determine a second gas power estimate based on the LHV estimate and a product of a thermal efficiency parameter and the estimated engine gas flow amount. In various embodiments, the thermal efficiency parameter corresponds to the thermal efficiency correction amount. The control system 11 can then determine a final gas power estimate based on the first and second gas power estimates. In various embodiments, the control system 11 can be configured to estimate a G/D of the internal combustion engine 20. In various embodiments, the control system 11 is configured to estimate the G/D of the internal combustion engine 20 by dividing the final gas power estimate by the first total engine power estimate.

As shown in FIG. 5, the control system 11 can then calculate a difference between the first total indicated engine load (e.g., power, torque, etc.) (determined in the operation 420) and the second total indicated engine load (e.g., power, torque, etc.) (determined in the operation 450) in an operation 460. The control system 11 can then compare the difference between the first and second total indicated engine loads (calculated in the operation 460) to a predetermined threshold in an operation 465. For example, in various implementations, the control system 11 can determine a difference between the predetermined threshold and the difference between the first and second total indicated engine loads (i.e., total indicated engine load delta). In various embodiments, the predetermined threshold can be set by the OEM and/or a user of the dual fuel engine system 10.

Accordingly, if the difference between the total indicated engine load delta and the predetermined threshold is greater than a predetermined amount, the control system 11 can determine that the dual fuel engine system 10 is operating in an abnormal or adverse condition. In various embodiments, the predetermined threshold is associated with a predetermined period of time. For example, if the difference between the total indicated engine load delta and the predetermined threshold is greater than the predetermined amount for a predetermined period of time, the control system 11 can determine that the dual fuel engine system 10 is operating in an abnormal or adverse state. Accordingly, responsive to the control system 11 determining that the difference between the first and second total indicated engine loads satisfying the predetermined threshold (or that the total indicated engine load delta exceeds the predetermined amount), the control system 11 can activate one or more engine protective measures 470. For example, the control system 11 can disable dual fuel operation, perform a shut down, and/or cause a reduction in engine speed, etc.

Figure 6:
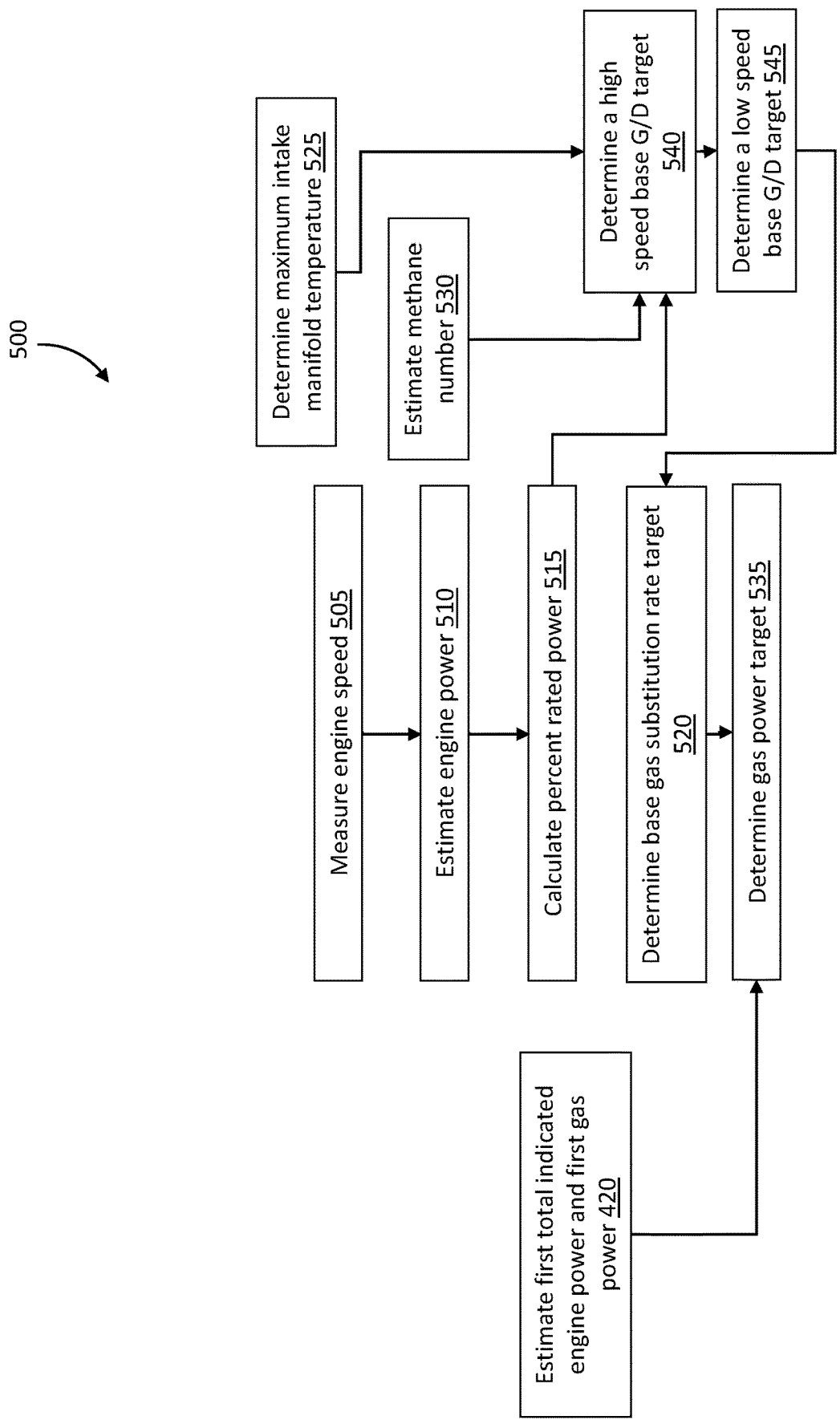
FIG. 6 is a flow diagram illustrating a method carried out by the control system of FIG. 2, according to an exemplary embodiment.

In other embodiments, the control system 11 can be configured to determine one or more gas power targets associated with the internal combustion engine 20. FIG. 6 shows a method 500 of determining a gas power target associated with the internal combustion engine 20. In an operation 505, the control system 11 measures the engine speed and estimates an engine power amount in an operation 510. In various embodiments, the engine speed is sensed by the sensor 95, 35, and/or 40. In some embodiments, the engine power amount is a net engine power amount. The control system 11 can calculate a percent of rated power ("percent power") of the internal combustion engine 20 in an operation 515 based on the estimated engine power from operation 510. The percent rated power may be calculated by dividing the net engine power by a rated engine power limit and multiplying by 100%. The control unit can also determine an intake manifold temperature (e.g., maximum intake manifold temperature) in an operation 525 and an estimate of the MN of the gas in an operation 530. The control system 11 can determine a base gas substitution rate (G/D) target for the internal combustion engine 20 in an operation 520. In various embodiments, the control system 11 determines the base G/D target based on the engine speed, the percent rated power, the intake manifold temperature (determined in the operation 525), and the estimated MN of the internal combustion engine 20. The control system 11 then determines a gas power target for the internal combustion engine 20 in an operation 535 based on the base gas substitution rate target determined in the operation 520. In various embodiments, the gas power target is based on the base G/D target and a first indicated engine power estimate. In some embodiments, the controller 11 determines the first indicated engine power estimate by carrying out the operation 420 of the method 400. In various embodiments, the first indicated engine power is based on the estimated engine power amount and a friction power loss amount.

In various embodiments, the base G/D target determined in the operation 520 is based on a first speed base G/D target when the engine speed is above a threshold, which can be determined in an operation 540, and a speed base G/D target when the engine speed is below the threshold, which can be determined in an operation 545. In various embodiments, at least one of the first speed base G/D target or the second speed base G/D target are determined based on the intake manifold temperature (determined in the operation 525) and/or the estimated methane number (determined in the operation 530). In various embodiments, the first speed base G/D target is a high speed base G/D target and the second speed base G/D target is a low speed base G/D target (i.e., lower than the first base G/D target). In some embodiments, the high speed base G/D target is based on the percent rated power, the intake manifold temperature, and the MN estimate. Similarly, the low speed base G/D target is based on the percent rated power, the intake temperature, and the MN estimate. Accordingly, the base G/D target determined in the operation 520 is further determined by engine-speed based interpolation between the high speed base G/D target and the low speed base G/D target. In various embodiments, the high speed base G/D target is determined from a first set of look-up tables and the low speed base G/D target is determined from a second set of look-up tables (i.e. from the look-up tables/database 145).

Figure 7:
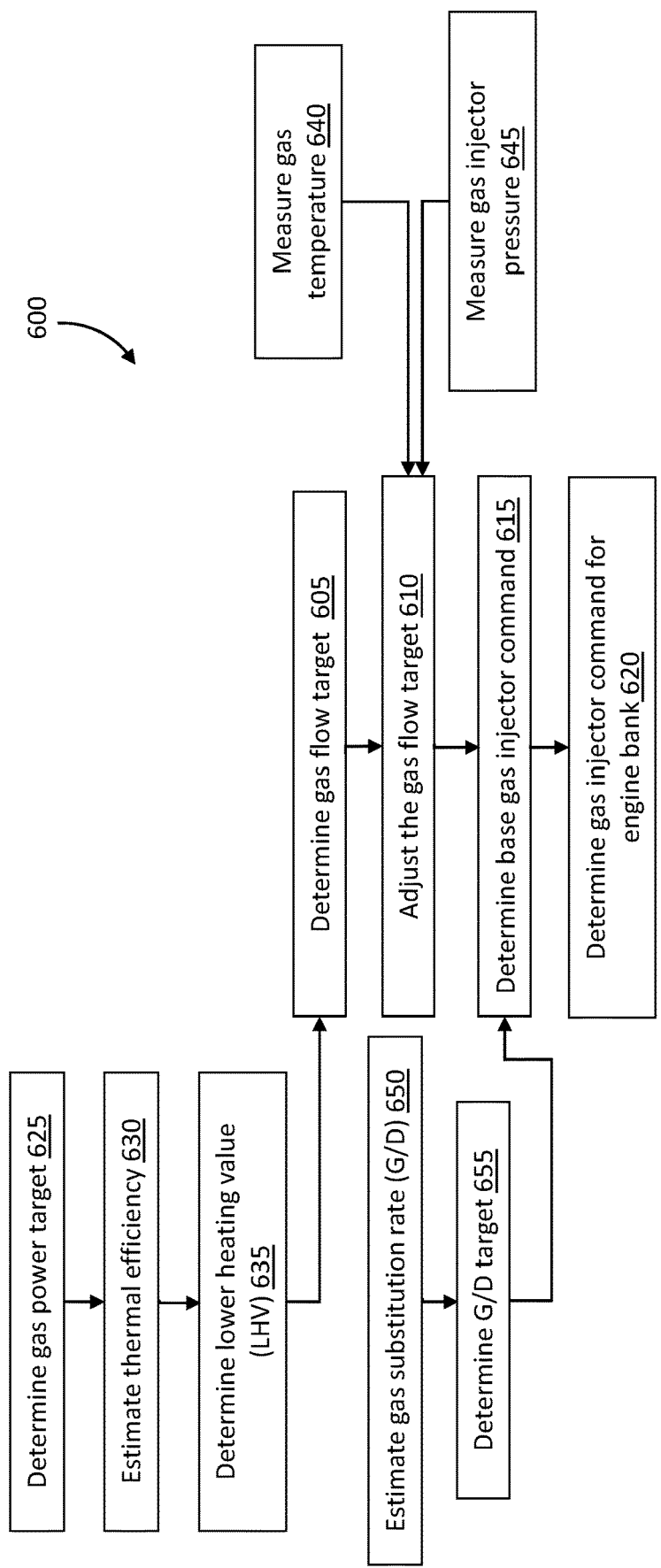
FIG. 7 is a flow diagram illustrating a method carried out by the control system of FIG. 2, according to an exemplary embodiment.

In various embodiments, the control system 11 can be configured to operate the dual fuel engine system 10 in order to determine one or more gas injector commands for at least one engine bank within the internal combustion engine 20. FIG. 7 illustrates a method 600 for determining at least one gas injector command for at least one engine bank within the internal combustion engine 20. In an operation 605, the control system 11 is configured to determine a gas flow target. In various implementations, the gas flow target is based on a gas power target determined in an operation 625, a thermal efficiency estimate determined in an operation 630, and an LHV determined in an operation 635. In some implementations, the gas power target determined in the operation 625 is determined by the control system 11 via the method 500. In other implementations, the LHV determined in the operation 635 is determined via the control system 11 carrying out one or more operations similar or equivalent to the operation 445. In other embodiments, the LHV determined in the operation 635 is determined via an LHV sensor or a look-up table based on the measured or estimated MN. In various embodiments, determining the gas flow target in the operation 605 includes dividing the gas power target by the thermal efficiency estimate and the LHV.

The control system 11 is configured to adjust the gas flow target in an operation 610 based on at least one of a measured gas temperature determined in an operation 640 and/or a measured gas injector pressure in an operation 645. In various embodiments, at least one of the gas temperature or the gas injector pressure is measured by the sensors 35, 40, and/or 95. Using the adjusted gas flow target determined in the operation 610, the control system 11 is configured to determine at least one base gas injector command in an operation 615. In various embodiments, the at least one base gas injector command is further determined based on an estimated G/D of the internal combustion engine 20 determined in an operation 650, and a G/D target determined in an operation 655. In various implementations, the G/D target determined in the operation 655 is determined by the controller 11 by implementing one or more operations similar or equivalent to the operation 520. The control system 11 can then determine at least one gas injector command for at least one engine bank of the internal combustion engine 20 in an operation 620. In some embodiments, the gas power target is based on a first indicated engine power estimate and the G/D target. In various implementations, the first indicated engine power estimate is determined by the controller 11 by carrying out the operation 420. In some implementations, adjusting the gas flow target in the operation 610 includes calculating an adjusted gas flow target amount. In various embodiments, the gas flow target amount is based on a product of the gas flow target and at least one of the following: a first ratio of the measured gas temperature and a temperature reference amount, or a second ratio of the measured gas injector pressure and a pressure reference amount.

In various implementations, the control system 11 can be further configured to estimate a total gas flow amount. In various embodiments, the estimated total gas flow amount is based on the measured gas injector pressure (determined in the operation 645), the measured gas temperature (determined in the operation 640), and the at least one gas injector command for the at least one engine bank. In some implementations, the at least one gas injector command for the at least one engine bank includes a left bank gas injector command (i.e., for the left bank 30) and a right bank gas injector command (i.e., for the right bank 31). In other implementations, determining the left bank gas injector command and determining the right bank gas injector command includes biasing the at least one gas injector command for the at least one engine bank to each of the left bank 30 and the right bank 31. In various embodiments, biasing the at least one gas injector command for the at least one engine bank to each of the left and right banks 30, 31 is based on an exhaust temperature difference associated with each of the left bank 30 and the right bank 31. In some embodiments, the exhaust temperature difference is measured by the sensors 35, 40, and/or 95. In other embodiments, the exhaust temperature difference corresponds to a difference in an exhaust temperature measured at the left bank 30 and an exhaust temperature measured at the right bank 31. Accordingly, during operation of the dual engine system 10, the control system 11 can measure the exhaust temperature of the left bank 30, measure the exhaust temperature of the right bank 31, and determine a difference between the exhaust temperature of the left bank 30 and the exhaust temperature of the right bank 31. The control system 11 can then add a left bank adjustment amount to the at least one gas injector command for the at least one engine bank. In various embodiments, the control system 11 adds the left bank adjustment amount to the at least one gas injector command to determine a first adjusted base gas injector command based on the difference between the left and right bank exhaust temperatures. Similarly, the control system 11 can then add a right bank adjustment amount to the at least one gas injector command for the at least one engine bank. In various embodiments, the control system 11 adds the right bank adjustment amount to the at least one gas injector command to determine a second adjusted base gas injector command based on the difference between the left and right bank exhaust temperatures. The control system 11 can then convert each of the first adjusted base gas injector command and the second adjusted base gas injector command respectively to the left bank gas injector command the right bank gas injector command.

In some implementations, determining the at least one gas injector command for the at least one engine bank in the operation 615 includes determining a feedforward input for a G/D PID controller, which is operably coupled to the internal combustion engine 20. In various embodiments, the G/D PID controller is the controller 150. In some embodiments, the feedforward input is based on a look-up table. In various embodiments, the look-up table is determined or referenced from the diesel ECM and torque fueling calculations module 45, the diesel air handling, aftertreatment & fuel system reference determination & control module 60, and/or the indicated engine power & gas power estimation module 115. In various embodiments, the look-up table is based on at least one of the measured gas injector pressure, the measured gas temperature, or the adjusted gas flow target amount. In some embodiments, the control system 11 is further configured to determine at least one heat control valve command. In various embodiments, the at least one heat control valve command is associated with the heater control valve 195. In some embodiments, the at least one heat control valve command is based on the measured gas temperature and/or a measured gas mass flow within the internal combustion engine 20. In yet other embodiments, the control system 11 is further configured to adjust at least one gas temperature setpoint based on the measured MN and/or the estimated MN number. In various embodiments, the measured MN is measured by the sensors 35, 40, and/or 95. In some embodiments, the estimated MN number is determined by the MN estimation module 125. In some implementations, the at least one gas temperature setpoint is based on an engine protection setpoint. In various embodiments, the engine protection setpoint is determined or set by the OEM system 12, the diesel control system 14, or the gas control system 16.

Figure 8:
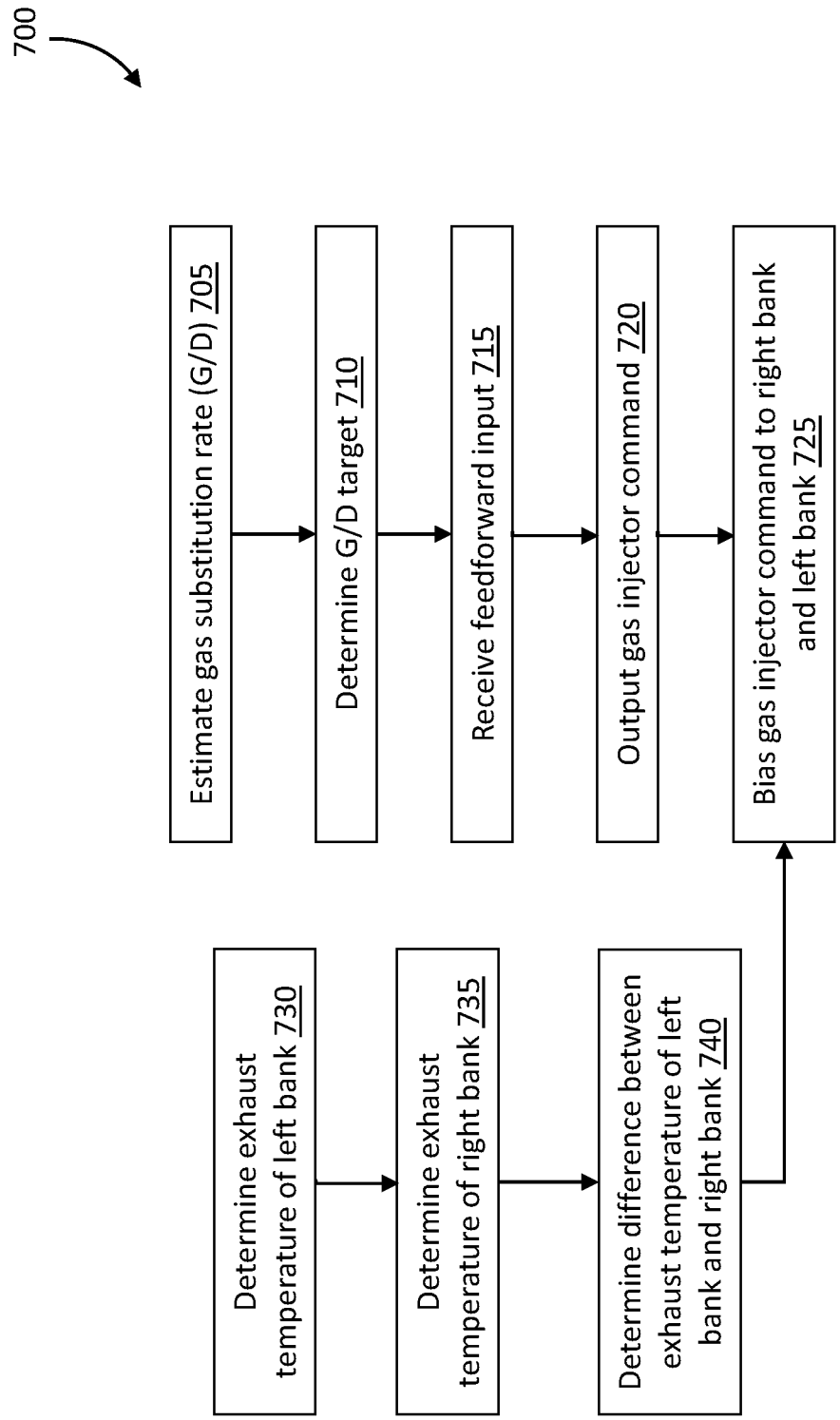
FIG. 8 is a flow diagram illustrating a method carried out by the control system of FIG. 2, according to an exemplary embodiment.

FIG. 8 shows a method 700 carried out by the dual fuel engine system 10. In various embodiments, the dual fuel engine system 10 includes at least one PID controller coupled to the internal combustion engine 20 and the gas injector 28. In an operation 705, the control system 11 determines a G/D estimate. In various embodiments, the G/D estimate is determined from the LHV and G/D estimation module 120. The control system 11 then determines a G/D target in an operation 710. In various embodiments, the control system 11 determines the G/D target in the operation 710 by carrying out one or more operations similar or equivalent to the operation 520 in the method 500. In an operation 715, the at least one PID controller is configured to receive a feedforward input in addition to the G/D estimate and the G/D target. In various embodiments, the feedforward input is based on a look-up table, which can be determined or referenced from the diesel ECM and torque fueling calculations module 45, the diesel air handling, aftertreatment & fuel system reference determination & control module 60, and/or the indicated engine power & gas power estimation module 115. In some embodiments, the G/D target is determined from the LHV and G/D estimation module 120. In an operation 720, the at least one PID controller is configured to output at least one gas injector command. In an operation 725, the at least one PID controller then biases the at least one gas injector command to each of the left bank 30 and the right bank 31. In various embodiments, the at least one PID controller biases the at least one gas injector command to each of the left bank 30 and the right bank 31 based on the difference between each of the left bank exhaust temperature (determined in the operation 730) and the right bank exhaust temperature (determined in the operation 735). In various embodiments, the exhaust temperature difference is determined in an operation 740. In some embodiments, the at least one PID controller includes a first PID controller and a second PID controller. For example, the first PID controller can be configured to receive the feedforward input, the G/D estimate, and the G/D target (i.e., the PID controller 150), and the second PID controller can be configured to bias the at least one gas injector command to each of the left bank 30 and the right bank 31 (i.e., the bank balancing PID 155).

In some embodiments, the dual fuel engine system 10 includes an aftertreatment system (i.e., controlled by the aftertreatment control system 85) operably coupled to the internal combustion engine 20, a gas injection system that includes the at least one gas injector 28 (i.e., controlled by the gas injector control module 110), and an air handling system (i.e., controlled by the air handling control system 80) operably coupled to the internal combustion engine 20. In some embodiments, the aftertreatment system is a selective catalytic reduction (SCR) and oxidation catalysts (OC) system. In some embodiments, the gas injection system is configured to independently control gas injection (i.e., via the at least one gas injector 28) on each of the left bank 30 and the right bank 31. In other embodiments, the air handling system is configured to control air flow through the internal combustion engine 20. In some embodiments, the air handling system controls the air flow independently from an operating condition of the internal combustion engine 20. In other embodiments, the air flow is based on a predetermined value obtained from a look-up table. In various embodiments, the look-up table is determined from or corresponds to the database 75 in the module 60). In various embodiments, the predetermined value is associated with a target temperature in at least one location of the aftertreatment system.

Figure 9:
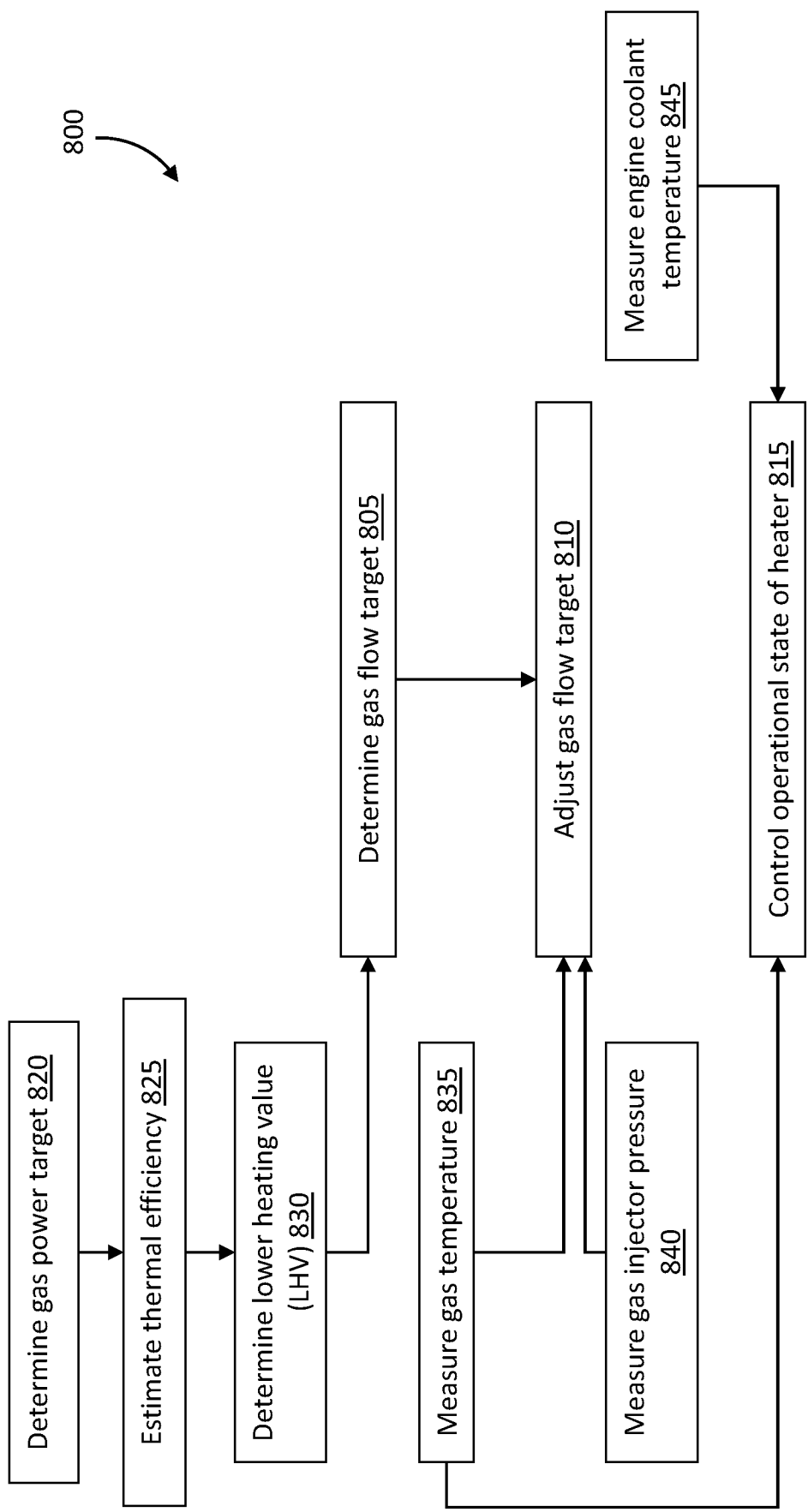
FIG. 9 is a flow diagram illustrating a method carried out by the control system of FIG. 2, according to an exemplary embodiment.

In various embodiments, the dual fuel engine system 10 includes one or more heaters operably coupled to the at least one gas injector 28 and the internal combustion engine 20. The at least one heater is configured to adjust a temperature of (i.e., heat) gas flowing within the internal combustion engine 20. FIG. 9 illustrates a method 800 for controlling an operational state of the heater, which is coupled to the internal combustion engine 20. In an operation 805, the control system 11 is configured to determine a gas flow target. For example, the control system 11 is configured to determine a gas flow target, via one or more operations that are similar or equivalent to the operation 605. In various implementations, the gas flow target determined in the operation 805 can be based on one or more of a gas power target, an estimated thermal efficiency, and an LHV. For example, the gas flow target can be based on a gas power target determined in an operation 820, an estimated thermal efficiency of the internal combustion engine 20 determined in an operation 825, and an LHV determined in an operation 830. The control system 11 can adjust the gas flow target in an operation 810 based on at least one of a measured gas temperature or a measured gas injector pressure. For example, the control system 11 is configured to adjust the gas flow target in an operation 810 based on at least one of a measured gas temperature determined in an operation 835 or a measured gas injector pressure determined in an operation 840. In various implementations, the measured gas temperature determined in the operation 835 is determined by the control system 11 by carrying out one or more operations similar or equivalent to the operation 640. In some embodiments, the measured gas temperature is determined via the sensors 35, 40, and/or 95. In various embodiments, the measured gas injector pressure determined in the operation 840 is determined by the control system 11 by carrying out one or more operations similar or equivalent to the operation 645. In some embodiments, the measured gas injector pressure is determined via the sensors 35, 40, and/95. The control system 11 can then control an operational state of the heater 32 based on at least one of the measured gas temperature or a measured engine coolant temperature. In some embodiments, at least one of the measured gas temperature or the measured engine coolant temperature is determined via the sensors 35, 40, and/or 95.

In some embodiments, the control system 11 is configured to perform an on/off control of the heater 32 responsive to a determination made regarding the measured gas temperature relative to one or more threshold temperatures. For example, the control system 11 is configured to control operation of the heater 32 in response to a determination that the measured gas temperature is less than a first threshold temperature for a first period. In particular, in some embodiments, the control system 11 is configured to operate the heater 32 (i.e., to turn on) in response to a determination that the measured gas temperature (determined in the operation 835) is less than a first threshold temperature for a first period. In various embodiments, the first threshold temperature is set by the OEM system 12, the diesel control system 14, or the gas control system 16. In other embodiments, the control system 11 is configured to control operation of the heater 32 in response to a determination that the measured gas temperature is greater than a second threshold temperature for a second period. For example, the control system 11 is configured to operate the heater 32 (i.e., to turn off) in response to a determination that the measured gas temperature (determined in the operation 835) is greater than a second threshold temperature for a second period. In various embodiments, the second threshold temperature is set by the OEM system 12, the diesel control system 14, or the gas control system 16.

Notwithstanding the embodiments described above in reference to FIGS. 1-9, various modifications and inclusions to those embodiments are contemplated and considered within the scope of the present disclosure.

The present technology may also include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method for controlling a dual fuel engine system, the method comprising:
- determining a gas flow target for an internal combustion engine of the dual fuel engine system, the gas flow target being based on a gas power target of the internal combustion engine, a thermal efficiency estimate of the internal combustion engine, and a lower heating value (LHV) within the internal combustion engine;
- adjusting the gas flow target based on at least one of a measured gas temperature or a measured gas injector pressure;
- determining at least one base gas injector command based on the adjusted gas flow target, a gas substitution rate estimate, and a gas substitution rate target; and
- determining, based on the at least one base gas injector command, a gas injector command for at least one engine bank.

B. The method of paragraph A, wherein the method further includes estimating a total gas flow based on the measured gas injector pressure, the measured gas temperature, and the at least one gas injector command for the at least one engine bank.

C. The method of paragraph A, wherein the at least one engine bank includes a left bank and a right bank, wherein the at least one gas injector command for the at least one engine bank includes a left bank gas injector command and a right bank gas injector command, and determining the left bank gas injector command and the right bank gas injector command includes:
- biasing the at least one gas injector command for the at least one engine bank to each of an engine right bank and an engine left bank based on an exhaust temperature difference associated with each of the engine right bank and the engine left bank.

D. The method of paragraph C, wherein biasing the at least one base gas injector command to each of the engine right bank and an engine left bank includes:
- measuring a left bank exhaust temperature;
- measuring a right bank exhaust temperature;
- determining a difference between the right bank exhaust temperature and the left bank exhaust temperature;
- adding a left bank adjustment amount to the at least one gas injector command for the at least one engine bank to determine a first adjusted base gas injector command based on the difference between the right bank exhaust temperature and the left bank exhaust temperature;
- adding a right bank adjustment amount to the at least one gas injector command for the at least one engine bank to determine a second adjusted base gas injector command based on the difference between the right bank exhaust temperature and the left bank exhaust temperature; and
- converting each of the first adjusted base gas injector command and the second adjusted base gas injector command respectively to the left bank gas injector command and the right bank gas injector command.

E. The method of paragraph A, wherein determining the gas flow target includes dividing the gas power target by the thermal efficiency estimate and the LHV.

F. The method of paragraph E, wherein the gas power target is based on a first indicated engine power estimate and the gas substitution rate target.

G. The method of paragraph A, wherein adjusting the gas flow target includes:
- calculating an adjusted gas flow target amount, the adjusted gas flow target amount being a product of the gas flow target and at least one of a first ratio of the measured gas temperature and a temperature reference amount or a second ratio of a measured pressure and a pressure reference amount.

H. The method of paragraph G, wherein determining at least one gas injector command for the at least one engine bank includes:
- determining a feedforward input for a gas substitution rate proportional-integral-derivative controller operably coupled to the internal combustion engine, the feedforward input being based on a look-up table referencing at least one of the measured gas injector pressure, the measured gas temperature, or the adjusted gas flow target amount.

I. The method of paragraph A, wherein the method further includes:
- determining at least one heater control command based on at least one of the measured gas temperature or a measured gas mass flow.

J. The method of paragraph I, wherein the method further includes:
- adjusting at least one gas temperature setpoint based on at least one of a measured methane number or an estimated methane number.

K. The method of paragraph J, wherein the at least one gas temperature setpoint is based on an engine protection setpoint.

L. A dual fuel engine system for an internal combusting engine, the dual fuel engine system comprising:
- at least one gas injector operably coupled to the internal combustion engine having a left bank and a right bank, the internal combustion engine being operable in a dual fuel mode; and
- at least one proportional-integral-derivative (PID) controller communicably coupled to the internal combustion engine and the at least one gas injector;
- wherein the at least one PID controller is configured to:

receive a feedforward input, a gas substitution rate estimate, and a gas substitution rate target;

output, based on the feedforward input, at least one gas injector command; and bias the at least one gas injector command to each of the right bank and the left bank based on an exhaust temperature difference associated with each of the right bank and the left bank.

M. The system of paragraph L, wherein the at least one PID controller is configured to bias the at least one gas injector command to each of the right bank and the left bank by carrying out the operations includes:

measuring a left bank exhaust temperature;

measuring a right bank exhaust temperature;

determining a difference between the right bank exhaust temperature and the left bank exhaust temperature;

adding a left bank adjustment amount to the at least one gas injector command to determine a first adjusted gas injector command;

adding a right bank adjustment amount to the at least one gas injector command to determine a second adjusted gas injector command; and converting each of the first adjusted gas injector command and the second adjusted gas injector command respectively to the left bank gas injector command and the right bank gas injector command.

N. The system of paragraph L, wherein the at least one PID controller includes a first PID controller and a second PID controller, wherein the first PID controller is configured to receive the feedforward input, the gas substitution rate estimate, and the gas substitution rate target, and wherein the second PID controller is configured to bias the at least one gas injector command to each of the right bank and the left bank.

O. The system of paragraph L, wherein the system further includes:

an aftertreatment system operably coupled to the internal combustion engine, the aftertreatment system being a selective catalytic reduction (SCR) and oxidation catalysts (OC) system;

a gas injection system operably coupled to the internal combustion engine, the gas injection system including the at least one gas injector, wherein the gas injection system is configured to independently control gas injection on each of the left bank and the right bank; and an air handling system operably coupled to the internal combustion engine, the air handling system configured to control an air flow through the internal combustion engine independent of an operating condition of the internal combustion engine, wherein the air flow is based on a predetermined value obtained from a look-up table, the predetermined value associated with a target temperature in at least one location of the aftertreatment system.

P. A dual fuel engine system operable in a dual fuel mode, the dual fuel engine system comprising:

an internal combustion engine having at least one engine bank;

at least one gas injector operably coupled to the internal combustion engine; and at least one controller communicably coupled to the internal combustion engine and the at least one gas injector;

wherein the at least one controller is configured to:

determine a gas flow target for the internal combustion engine, the gas flow target being based on a gas power target of the internal combustion engine, a thermal efficiency estimate of the internal combustion engine, and a lower heating value (LHV) within the internal combustion engine;

adjust the gas flow target based on at least one of a measured gas temperature or a measured gas injector pressure to determine an adjusted gas flow target for the dual fuel mode;

determine at least one base gas injector command based on the adjusted gas flow target, a gas substitution rate estimate, and a gas substitution rate target; and determine, based on the at least one base injector command, a gas injector command, a gas injector command for the at least one engine bank.

Q. The system of paragraph P, wherein the system further includes:

at least one heater operably coupled to the internal combustion engine, the at least one controller, and the at least one gas injector; and wherein the at least one controller is further configured to:

control an operational state of the least one heater based on the measured gas temperature and an engine coolant temperature; and operate the at least one heater responsive to a determination that the measured gas temperature is less than a first threshold temperature for a first period of time.

R. The system of paragraph Q, wherein the at least one controller is configured to control the at least one heater to turn off responsive to a determination that the measured gas temperature is greater than a second threshold temperature for a second period of time.

S. The system of paragraph P, wherein the at least one controller is further configured to:

determine, based on the at least one gas injector command, a left bank gas injector command and a right bank gas injector command.

T. The system of paragraph S, wherein the at least one controller is further configured to determine the gas flow target by dividing the gas power target by a thermal efficiency estimate and a lower heating value (LHV), wherein the LHV is determined on a look-up table based on an estimated methane number.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

In some embodiments, hardware and data processing components used to implement the various processes, operations, illustrative logics, logical blocks, modules and circuits described in connection with the embodiments disclosed herein, such as hardware and data processing components of controller (e.g., a memory within the controller 18, a memory within the OEM system 12, a memory in the diesel control system 14, or a memory within the gas control system 16), can be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor can be a microprocessor, or, any conventional processor, controller, microcontroller, or state machine. A processor also can be implemented as a combination of computing devices, such as a combination of a DSP and a microprocessor, a plurality of microprocessors, one or more microprocessors in conjunction with a DSP core, or any other such configuration. In some embodiments, particular processes and methods can be performed by circuitry that is specific to a given function. The memory (e.g., memory, memory unit, storage device) can include one or more devices (e.g., RAM, ROM, Flash memory, hard disk storage) for storing data and/or computer code for completing or facilitating the various processes, layers and modules described in the present disclosure. The memory can be or include volatile memory or non-volatile memory, and can include database components, object code components, script components, or any other type of information structure for supporting the various activities and information structures described in the present disclosure. According to an exemplary embodiment, the memory (e.g., a memory within the controller 18, a memory within the OEM system 12, a memory in the diesel control system 14, or a memory within the gas control system 16) is communicably connected to the processor via a processing circuit and includes computer code for executing (e.g., by the processing circuit or the processor) the one or more processes described herein.

The present disclosure contemplates methods and systems on any machine-readable media for accomplishing various operations, e.g., such as operations 305-360 of the method 300, operations 405-470 of the method 400, operations 505-545 of the method 500, operations 605-655 of the method 600, operations 705-740 of the method 700, and operations 805-845 of the method 800. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description can illustrate a specific order of method steps, the order of such steps can differ from what is depicted and described, unless specified differently above. Also, two or more steps can be performed concurrently or with partial concurrence, unless specified differently above.

It is important to note that any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A method for controlling a dual fuel engine system, the method comprising:
   estimating, by a controller within the dual fuel engine system, a total engine load of an internal combustion engine within the dual fuel engine system, the estimating of the total engine load comprising:
      measuring an engine power amount;
      estimating a power loss amount within the internal combustion engine; and
      determining a sum of the measured engine power amount and the estimated power loss amount;
   determining, by the controller, a total fueling amount of the internal combustion engine, the determining of the total fueling amount comprising:
      measuring an engine speed; and
      calculating a speed governor indicated torque command; and
   controlling the dual fuel engine system using the total fuel amount, wherein controlling the dual fuel engine system comprises:
      determining an updated total fueling amount based on an operational state of a dual fuel mode switch within the internal combustion engine.

2. The method of claim 1, wherein controlling the dual fuel engine system using the total fuel amount comprises:
   determining at least one control input for at least one actuator within the dual fuel engine system.

3. The method of claim 2, wherein determining the at least one control input for the at least one actuator comprises determining at least one control input for a diesel fuel system actuator.

4. The method of claim 2, wherein determining the updated total fueling amount comprises determining a first updated fueling amount and a second updated fueling amount.

5. The method of claim 4, wherein determining the first updated fueling amount comprises determining a maximum between the total fueling amount and a first diesel fuel command.

6. The method of claim 5, wherein determining the second updated fueling amount comprises:
determining a diesel fuel equivalent amount of a second fuel by subtracting the first diesel fuel command from the first total updated fueling amount; and
adding the diesel fuel equivalent amount to a second diesel fuel command.

7. The method of claim 1, wherein determining the at least one control input for the at least one actuator comprises selecting a set of look-up tables based on one or more parameters associated with the internal combustion engine and referencing the set of look-up tables to determine the at least one control input.

8. The method of claim 7, wherein selecting the set of look-up tables comprises determining a compressor inlet density (CID) of the internal combustion engine.

9. The method of claim 7, wherein selecting the set of look-up tables comprises determining an operational state of a dual fuel mode switch within the internal combustion engine.

10. The method of claim 7, wherein selecting the set of look-up tables comprises selecting at least one of an air handling reference table, an aftertreatment reference table, or a fueling reference table.

11. A dual fuel engine system comprising:
an internal combustion engine; and
at least one controller communicably coupled to the internal combustion engine, the at least one controller being configured to:
estimate a total engine load of the internal combustion engine based on a measured engine power amount and an estimated power loss amount;
output the estimated total engine load to at least one fuel control system;
determine a total fueling amount of the internal combustion engine;
determine an updated total fueling amount based on an operational state of a dual fuel mode switch within the internal combustion engine; and
determine at least one control input for at least one actuator of the dual fuel engine system.

12. The system of claim 11, wherein the at least one actuator is at least one of a diesel type actuator, an air handling actuator, or an aftertreatment actuator.

13. The system of claim 11, wherein the at least one controller is configured to determine total fueling amount by referencing at least one torque-to-fuel reference table, the at least one torque-to-fuel reference table being based on an engine speed and an indicated diesel torque input.

14. The system of claim 13, further comprising at least one sensor in communication with each of the internal combustion engine and the at least one controller, the at least one sensor being configured to determine the indicated diesel torque input.

15. The system of claim 11, wherein the at least one controller is configured to determine the indicated diesel torque input based on a friction power estimate and an engine speed torque demand amount.

16. The system of claim 15, wherein the engine speed torque demand amount corresponds to a difference between the engine speed and a predetermined engine speed target.

17. The system of claim 11, wherein the at least one controller is configured to determine the total fueling amount by measuring an engine speed and calculating a speed governor indicated torque command.

18. The system of claim 11, wherein the at least one fuel control system is a diesel fuel control system.

* * * * *